W. H. PERKINS.
SCRAPER.
APPLICATION FILED MAR. 15, 1911.
1,085,355.
Patented Jan. 27, 1914.
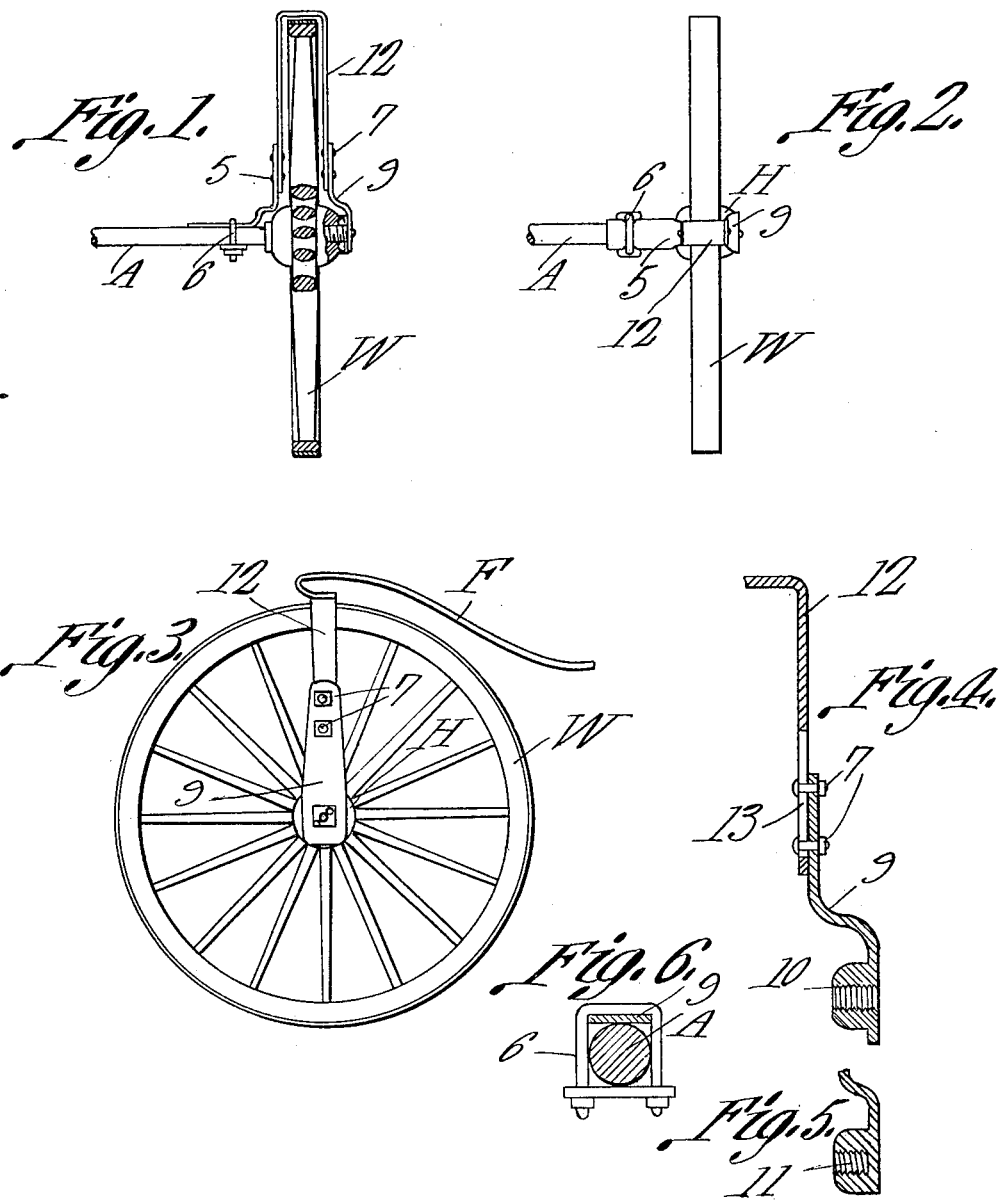
W. H. Perkins,
Inventor
by C. A. Snow & Co.
Attorneys
Witnesses

UNITED STATES PATENT OFFICE.

WILLIAM H. PERKINS, OF BONAPARTE, IOWA.

SCRAPER.

1,085,355.   Specification of Letters Patent.   Patented Jan. 27, 1914.

Application filed March 15, 1911.   Serial No. 614,713.

*To all whom it may concern:*

Be it known that I, WILLIAM H. PERKINS, a citizen of the United States, residing at Bonaparte, in the county of Van Buren and State of Iowa, have invented a new and useful Scraper, of which the following is a specification.

The present invention appertains to attachments for vehicle wheels, and relates more particularly to a scraper applicable to various vehicle wheels.

It is the object of the present invention to provide a novel and improved scraper which shall be applicable to various vehicle wheels, to constantly scrape off the soil picked up by the wheel, and to support a fender.

Another object of the present invention is to provide a device of the nature indicated which shall be of a unique or peculiar construction, in order to most effectively adapt it for the purposes for which the device is intended, and to enable the device to be adjusted to accommodate various diameters of wheels.

With the foregoing and other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiments in the accompanying drawing wherein:

Figure 1 is an upright sectional view of the vehicle wheel illustrating the improved scraper applied thereto. Fig. 2 is a plan view of the wheel with the scraper attached. Fig. 3 is an outside elevation of the wheel and attachment. Fig. 4 is a sectional detail of the outer portion of the attachment. Fig. 5 is a sectional detail of a modification. Fig. 6 is an enlarged cross section through the axle and angular member.

In the drawings, the vehicle wheel has been designated generally by the letter W, and its hub, by the letter H, the hub being journaled on the spindle or end portion of the axle A.

The present attachment includes an angular bar 5, having one arm resting against the top of the axle A next inside the wheel W, a clip 6 embracing the said arm and axle to clamp the bar in position. The other arm of the said bar extends radially upward from the axle, adjoining the wheel, and has its free portion offset toward the wheel, over the hub, as clearly seen in Fig. 1. In this manner, the free or off set portion of the upright arm of the bar 5 will coöperate with the inner ends of the spokes of the wheels, while the bend of the said arm will coöperate with the hub.

A nut 10 is threaded onto the end of the axle or spindle, to retain the hub of the wheel in position, and this nut is provided with the radial tongue 9 having its free portion offset toward the wheel over the hub, in order that the free portion of the tongue will coöperate with the inner ends of the spokes, and in order that the bend of the tongue will coöperate with the outer portion of the hub.

A U-shaped scraper bar 12 straddles the top of the wheel, with its arms disposed snugly adjoining the spokes of the wheel and with its intermediate portion disposed relatively close to the periphery or tire of the wheel, to scrape the mud and dirt therefrom. The end portions of the scraper bar or yoke 12 overlap the inner faces of the offset portions of the tongue 9 and upright arm of the bar 5, the said end portions of the scraper bar having longitudinal slots 13, and a pair of bolts or clamping members 7 being carried by each of the said offset portions and engaging through the respective slots 13.

A fender F has one terminal attached to the intermediate portion or bend of the scraper bar or yoke 12 to be supported by the attachment.

The present attachment may be applied to various diameters of vehicle wheels, and may be applied to a vehicle wheel in a novel manner. Thus, after the wheel is placed on the spindle or end of the axle, the nut 10 may be engaged to the end of the axle, or the spindle, and the tongue 9 may be employed as a handle or wrench for tightening the nut. The inner angular member 5 is then secured to the axle inside the wheel, by means of the clip or clamp 6, and the tongue 9 is swung into coincidence with the upright arm of the member 5. The scraper or yoke 12 is then set astride the top of the wheel, so that its arms overlap the adjoining faces of the off set portions of the members 5 and 9, after which, the bolts 7 are inserted through the slots 13 and the off set portions. The yoke or scraper 12 may then be adjusted radially to bring its intermediate portion into proper coöperation with the tire of the wheel, after which, the bolts 7 are tightened, to clamp the yoke or scraper in position. It is to be noted that the yoke or scraper may be attached together with the fender and it is to be noted that when the scraper or yoke is applied, the offset portions of the members 5 and 9 will coöperate with the arms of the yoke for cleaning the mud or extraneous matter from the opposite sides of the spokes. On small wheels, the scraper or yoke 12 may be adjusted inwardly, so that its ends project to the hub of the wheel, so that the arms of the yoke or scraper extend completely along the spokes. The scraper or yoke connecting the tongue 9 and the angular bar 5 will also lock the nut upon the axle or its spindle.

The tap of the nut may extend completely therethrough, as illustrated in Fig. 4, or may extend only partially through the nut as at 11 in Fig. 5, so as to provide a socket nut. Either form of nut may be employed with equal propriety.

What is claimed is:

The combination with an axle and a wheel journaled thereon, of a nut threaded onto the end of the axle having a radial tongue, the free portion of the tongue being off set toward the wheel over the hub thereof, an angular bar having one arm resting against the axle, means embracing the said arm and axle to clamp the said bar in position, the other arm of the said bar being disposed adjoining the wheel and having its free portion off set toward the wheel, over the hub, a U-shaped scraper bar straddling the wheel and having its end portions overlapping the adjoining faces of the off set portions of the tongues and respective arm of the angular bar, the end portions of the scraper bar having longitudinal slots, and clamping members carried by the said off set portions and engaging through the said slots.

In testimony that I claim the foregoing as my own, I have hereto affixed my signature in the presence of two witnesses.

WILLIAM H. PERKINS.

Witnesses:
PHILLIP O. BECK,
J. O. MORRIS.

---

Copies of this patent may be obtained for five cents each, by addressing the "Commissioner of Patents. Washington, D. C."